(12) United States Patent
Matsuzawa et al.

(10) Patent No.: US 7,143,990 B2
(45) Date of Patent: Dec. 5, 2006

(54) APPARATUS AND METHOD FOR THE PRODUCTION OF OPHTHALMIC LENSES

(75) Inventors: Yasuo Matsuzawa, Roswell, GA (US); Harald Bothe, Wiesbaden (DE); Bernhard Seiferling, Goldbach (DE)

(73) Assignee: Novartis AG, Basel (CH)

( * ) Notice: Subject to any disclaimer, the term of this patent is extended or adjusted under 35 U.S.C. 154(b) by 230 days.

(21) Appl. No.: 10/106,739

(22) Filed: Mar. 26, 2002

(65) Prior Publication Data

US 2002/0163619 A1 Nov. 7, 2002

(51) Int. Cl.
B29D 11/00 (2006.01)

(52) U.S. Cl. .................. 249/114.1; 249/134; 425/808

(58) Field of Classification Search ............. 249/114.1, 249/134; 425/808; 264/2.5
See application file for complete search history.

(56) References Cited

U.S. PATENT DOCUMENTS

| | | | |
|---|---|---|---|
| 2,936,222 A | 5/1960 | Stevens | 23/292 |
| 3,008,920 A | 11/1961 | Ulrich | 260/45.5 |
| 3,070,573 A | 12/1962 | Beck | 260/45.5 |
| 3,854,982 A | 12/1974 | Aelion et al. | 117/68 |
| 3,871,803 A | 3/1975 | Beattie | 425/175 |
| 4,032,440 A | 6/1977 | Yasuda | 210/23 |
| 4,113,224 A | 9/1978 | Clark et al. | 249/105 |
| 4,121,896 A | 10/1978 | Shepherd | 425/412 |
| 4,137,550 A | 1/1979 | Kagnanowicz et al. | 358/128 |
| 4,311,573 A | 1/1982 | Mayhan et al. | 204/159.15 |
| 4,312,575 A | 1/1982 | Peyman et al. | 351/160 |
| 4,468,229 A | 8/1984 | Su | 8/507 |
| 4,501,805 A | 2/1985 | Yasuda et al. | 429/174 |
| 4,503,133 A | 3/1985 | van Lier et al. | 429/174 |
| 4,553,975 A | 11/1985 | Su | 8/507 |
| 4,559,059 A | 12/1985 | Su | 9/507 |
| 4,589,964 A | 5/1986 | Mayhan et al. | 522/85 |
| 4,632,844 A | 12/1986 | Yanagihara et al. | 427/38 |
| 4,664,936 A | 5/1987 | Ueno et al. | 427/38 |
| 4,692,347 A | 9/1987 | Yasuda | 427/40 |
| 4,749,457 A | 6/1988 | Yasuda et al. | 204/150 |
| 4,752,426 A | 6/1988 | Cho | 264/22 |

(Continued)

FOREIGN PATENT DOCUMENTS

EP 0 183 324 6/1986

(Continued)

OTHER PUBLICATIONS

Wang et al., "Modification of Wettability of a Stainless-Steel Plate by Cathodic Plasma Polymerization of Trimethylsilane-Oxygen Mixture"; Journal of Applied Polymer Science, vol. 55, 903-909 (1995).*

(Continued)

*Primary Examiner*—Donald Heckenberg
(74) *Attorney, Agent, or Firm*—Karen Borrelli

(57) ABSTRACT

An apparatus and method for the production of ophthalmic lenses, and particularly contact lenses, which minimizes damage of the lens in removal from the mold. The ophthalmic lens is produced in a mold having a male part and a female part that are placed in proximate relation to each other to create a lens-forming cavity. At least the female surface of the female part mold is preferably coated with plasma and is irradiated for a predetermined time such that the female surface and/or surface coating is at least partially cured. Once the female surface, and alternately the male surface and other surfaces of the mold, is at least partially cured, a curable lens-forming material is placed into the lens-forming cavity and cured to form an ophthalmic lens.

7 Claims, 1 Drawing Sheet

U.S. PATENT DOCUMENTS

| | | |
|---|---|---|
| 4,761,436 A | 8/1988 | Kohno et al. ............... 522/114 |
| 4,948,485 A | 8/1990 | Wallsten et al. ............ 204/164 |
| 4,968,532 A | 11/1990 | Janssen et al. .............. 427/164 |
| 4,980,196 A | 12/1990 | Yasuda et al. ................ 427/38 |
| 4,981,713 A | 1/1991 | Yasuda et al. ................ 427/38 |
| 4,994,298 A | 2/1991 | Yasuda ....................... 427/41 |
| 5,028,332 A | 7/1991 | Ohnishi ................. 210/500.34 |
| 5,080,839 A | 1/1992 | Kindt-Larsen .............. 264/2.6 |
| 5,094,609 A | 3/1992 | Kindt-Larsen .............. 425/445 |
| 5,114,629 A | 5/1992 | Morland et al. ............. 264/2.5 |
| 5,158,717 A | 10/1992 | Lai ........................... 264/1.1 |
| 5,176,938 A | 1/1993 | Wallsten et al. ............ 427/447 |
| 5,182,000 A | 1/1993 | Antonelli et al. ........ 204/181.1 |
| 5,252,056 A | 10/1993 | Horner et al. .............. 425/555 |
| 5,267,390 A | 12/1993 | Yang et al. ................ 29/527.4 |
| 5,270,082 A | 12/1993 | Lin et al. .................... 427/539 |
| 5,274,008 A | 12/1993 | Lai ........................... 523/107 |
| 5,278,384 A | 1/1994 | Matsuzawa et al. ... 219/121.36 |
| 5,312,529 A | 5/1994 | Antonelli et al. ........ 204/181.1 |
| 5,394,988 A | 3/1995 | Edwards et al. ............. 206/5.1 |
| 5,461,570 A | 10/1995 | Wang et al. ................ 364/468 |
| 5,467,868 A | 11/1995 | Abrams et al. ............. 206/5.1 |
| 5,508,317 A | 4/1996 | Muller ........................ 522/85 |
| 5,551,663 A | 9/1996 | Bae et al. ................... 249/115 |
| 5,574,554 A | 11/1996 | Su et al. ...................... 356/124 |
| 5,583,163 A | 12/1996 | Muller ....................... 522/152 |
| 5,674,557 A | 10/1997 | Widman et al. ............ 427/133 |
| 5,679,385 A | 10/1997 | Adams et al. ........... 425/174.4 |
| 5,702,735 A | 12/1997 | Martin et al. ............... 425/548 |
| 5,776,999 A | 7/1998 | Nicolson et al. ............ 523/106 |
| 5,782,460 A | 7/1998 | Kretzschmar et al. ..... 264/1.36 |
| 5,805,264 A | 9/1998 | Janssen et al. .......... 351/160 R |
| 5,815,238 A | 9/1998 | Beaton et al. ............... 351/177 |
| 5,849,811 A | 12/1998 | Nicolson et al. ............ 523/106 |
| 5,850,107 A | 12/1998 | Kindt-Larsen et al. ....... 264/1.1 |
| 5,861,114 A | 1/1999 | Roffman et al. ............. 264/2.5 |
| 5,874,127 A | 2/1999 | Winterton et al. .......... 427/164 |
| 5,894,002 A | 4/1999 | Boneberger et al. ....... 264/1.36 |
| 5,922,249 A | 7/1999 | Ajello et al. ................. 264/1.1 |
| 5,935,492 A | 8/1999 | Martin et al. .............. 264/1.37 |
| 5,968,422 A * | 10/1999 | Kennedy .................... 264/1.1 |
| 6,310,116 B1 | 10/2001 | Yasuda et al. .............. 523/106 |
| 6,565,776 B1 | 5/2003 | Li et al. ....................... 264/2.5 |

FOREIGN PATENT DOCUMENTS

| | | |
|---|---|---|
| EP | 0 226 123 | 6/1987 |
| EP | 0 255 088 | 2/1988 |
| EP | 0 264 255 | 4/1988 |
| EP | 0 366 356 | 5/1990 |
| EP | 0 367 513 | 5/1990 |
| EP | 0 255 535 | 6/1990 |
| EP | 0 484 015 | 5/1992 |
| EP | 0 604 178 | 6/1994 |
| EP | 0 604 179 | 6/1994 |
| EP | 0 607 692 | 7/1994 |
| EP | 0 637 490 | 2/1995 |
| EP | 0 645 235 | 3/1995 |
| EP | 0 671 249 | 9/1995 |
| EP | 0 685 734 | 12/1995 |
| EP | 0 686 459 | 12/1995 |
| EP | 0 686 486 | 12/1995 |
| EP | 0 686 558 | 12/1995 |
| EP | 0 686 585 | 12/1995 |
| EP | 0 686 841 | 12/1995 |
| EP | 0 686 898 | 12/1995 |
| EP | 0 686 899 | 12/1995 |
| EP | 0 686 901 | 12/1995 |
| EP | 0 687 550 | 12/1995 |
| EP | 0 687 551 | 12/1995 |
| EP | 0 691 195 | 1/1996 |
| EP | 0 765 734 | 4/1997 |
| FR | 1128971 | 4/1955 |
| WO | WO 96/11782 | 4/1996 |

OTHER PUBLICATIONS

Polymer Handbook, Brandup & Immergut, John Wiley & Sons, New York, 1975, pp. III 229-III 239.
International Search Report, undated.
European Search Report, dated Nov. 20, 2003.

* cited by examiner

APPARATUS AND METHOD FOR THE PRODUCTION OF OPHTHALMIC LENSES

BACKGROUND OF THE INVENTION

1. Field of the Invention

The invention generally relates to an apparatus and method for the production of ophthalmic lenses. More particularly, the present invention relates to the treatment of a mold which produces an ophthalmic lens, such as a contact lens, to minimize damage to the lens formed within the mold.

2. Description of the Related Art

Contact lenses can be manufactured economically in large numbers by the so-called mold or full-mold process. In the molding process, an ophthalmic lens is manufactured into a final form between typically male and female mold shapes, with no additional finishing work on the surface of the lens or the edges of the lens. Known ophthalmic lens-molding processes are described in, for example, PCT patent application no. WO/87/04390 or in EP-A 0 367 513.

A contact lens produced from a male-female molding process typically has little mechanical stability and a water content of more than 60% by weight. The geometry of the ophthalmic lens is specifically defined by the cavity between the male and female mold halves. The geometry of the edge of the ophthalmic lens is defined by the contour of the two mold halves in the area where they make contact.

In the manufacture a polymer contact lens, a predetermined amount of a semi-viscous polymeric material is placed in the female mold half and the mold is closed by placing the male mold half proximately to the female mold half to create a cavity having a desired size and cavity for a contact lens. Normally, a surplus of polymeric material is used so that when the male and female halves of the mold are closed, the excess amount of the material is expelled out into an overflow area adjacent to the mold cavity. The polymer material remaining within the mold is polymerized or cross-linked with the delivery of radiation thereto through UV light, heat action, or another non-thermal methods.

In U.S. Pat. No. 5,508,317, a new contact lens material is described as representing an improvement in the chemistry of polymerizable starting material for the manufacture of contact lenses. The '317 patent discloses a water-soluble composition of a prepolymer which is filled into the mold cavity and then the composition is photochemically cross-linked. The prepolymer has several cross-linkable groups whereby the cross-linking is sufficient to create a finished lens of optical quality within a few seconds without the necessity for subsequent extraction or finishing steps to the contact lens. The improved cross-linking chemistry of the starting polymeric material of the '317 patent permits the manufacture of contact lenses at considerably lower cost than the hitherto methods which thus makes it possible to produce disposable contact lenses that are discarded by the user after a single use.

Another process of using the prepolymer to manufacture a contact lens is disclosed in EP-A-0 637 490 which describes a manufacturing process for contact lenses with the prepolymer described in the '317 patent. In the '490 reference, the polymeric material is filled into a mold comprising two halves placed in proximate non-touching relation to create a thin circular gap between the halves. The circular gap is linked to the mold cavity such that surplus lens material can flow away from the mold cavity into the gap.

The molds for the ophthalmic lenses can be for one time use or reusable. Because of the water-soluble nature of the polymeric material, after the ophthalmic lens has been produced in the mold, the non-crosslinked prepolymer and other residues can be removed rapidly and effectively with water, and the molds air-dried. The cross-linking of the prepolymer is promoted through exposure of the prepolymer to radiation, typically with UV light, and the radiation is typically restricted to the mold cavity by a chromium screen. Through this common production method, only the prepolymer material in the mold cavity is cross-linked to produce the edges of the contact lens with two mold halves closed. The non-crosslinked prepolymer solution, i.e. the prepolymer not exposed to the radiation, is washed away from the shaped and formed contact lens, i.e. cross-linked prepolymer, with water.

There are several methods known in the art to include surfactants and other lubricants to mold surfaces to facilitate release of the contact lens and minimize any damage to the formed lens. An example of the use of surfactants in the molds is U.S. Pat. No. 5,542,978, which discloses a method and apparatus for employing a surfactant in order to assist in the release from each other of mold components of a multi-part mold employed in the molding of polymeric articles, such as a hydrophilic contact lenses, upon completion of the molding process. The surfactant is applied in the form of a film or coating on surface portions of one of the mold components to facilitate both the disengagement between the mold components during demolding and the removal of excess polymeric molding material adhesively deposited on mold surfaces.

In addition, WIPO application WO 00/76738 relates to the preparation of molds for the production of contact lenses. The patent teaches the use of a hard organic coating for the purpose of protecting a disposable plastic mould from attach by monomers used in the lense polymer formulation. The present invention differs, because it claims a plasma treatment for reusable moulds instead of disposable moulds and uses lenses materials not having destructive monomers.

Several problems arise when plastic moulds are used to make contact lenses. One problem is called "bubbling". Bubbling occurs when the polymer is dispensed into the mould—if the surface of the mould is not correctly treated, bubbles may form between the polymer and the mould surface. The bubbles remain after the lens is cured, resulting in a defective lens. Bubbles can form at the interface between the mold surface and the lens material when the lens materials do not have a good wettability or bubbles can be present in the lens materials during the lens material preparation. When the mold surface has a good wettability to the lens material, the lens material spreads over the mold surface evenly, which can eliminate the possibility of bubble being formed and trapped in the interface.

A lens made from an improperly treated plastic mould can also result in "sticking" to the polypropylene package which contains the lens for autoclaving and ultimate sale to the consumer. Sticking means that the lens adheres to the inner surface of the container where the lens contacts the container, requiring the consumer to apply excessive force to remove the lens therefrom. The excessive force can result in damage to the lens. The surface of the formed ophthalmic lens can depend on the surface of the mold to which the lens material is formed. In other words, the hydrophobic surface tends to make the ophthalmic lens surface rather hydrophobic, which makes good contact to the packaging material, in this case, polypropylene. In other case, if the air (or bubbles) are present at the interface, the surface of the lens may be less cured leaving the surface groups rather mobile. This can contribute to sticking to the polypropylene packaging surface. So, if the mold surface is a right selection to the lens material, the interface can be rather simple, i.e., mold and lens material. The lens surface will not have active mobility at the surface. Finally, if the plastic mould is intended to be reusable, the coating must be durable enough to withstand repeated manufacturing cycles Accordingly, it would be advantageous to provide an apparatus and method for producing ophthalmic lenses in a reusable mold that does not produce lenses having bubbles or sticking or which allows the production of a large number of commercial grade contact lenses from reusable plastic moulds. It is to the provision of such an improved apparatus and method for the production of ophthalmic lenses, and specifically contact lenses, that the present invention is primarily directed.

SUMMARY OF THE INVENTION

The lens is a plastic mould for producing an ophthalmic lens having a male part and a female part, the male part having a male surface and the female part having a female surface, wherein either the male surface, the female surface or both surfaces are treated to have a contact angle of less than 60 degrees but greater than 0 degrees. The mould surface may be treated with a mould coating such as plasma. Preferably, the plastic mould is reusable and the lenses resulting there from do not exhibit bubbling or sticking. Ideally, the polymeric formulation used to make the lens is free of monomer which reacts with the surface of an untreated plastic mould.

The present invention also provides a method for the production of ophthalmic lenses including the steps of: curing a polymerizable material in a mould to form an ophthalmic lens, wherein the mould has a male part and a female part, the male part having a male surface and the female part having a female surface, wherein either the male surface, the female surface or both surfaces are treated to have a contact angle of less than 60 degrees but greater than 0 degrees.

It is therefore the primary object of the present invention to provide an apparatus and method for producing ophthalmic lenses, and preferably contact lenses, which facilitates the removal of the finished lens from the mold and which reacts with the surface of the lens-forming material within the mold, in order to avoid bubbling and sticking. The chemical structure of either the surface of the mold cavity and/or the surface coating is changed so that the surface becomes non-reactive, and interacts with the lens polymer formulation to reduce bubbling and stickiness. The present inventive apparatus and method thus represents an economic advantage in the manufacture of high quality ophthalmic lenses as commercial grade lenses can be consistently produced in a reusable mold with minimal defects due to removal of the lens from the mold. Preferably, the mould will withstand at least 10 manufacturing cycles, more preferably 100, most preferably 1000 cycles or more.

Other objects, features, and advantages of the present invention will become apparent after review of the hereinafter set forth Brief Description of the Drawings, Detailed Description of the Invention, and the claims.

DETAILED DESCRIPTION OF THE INVENTION

Figure 1:
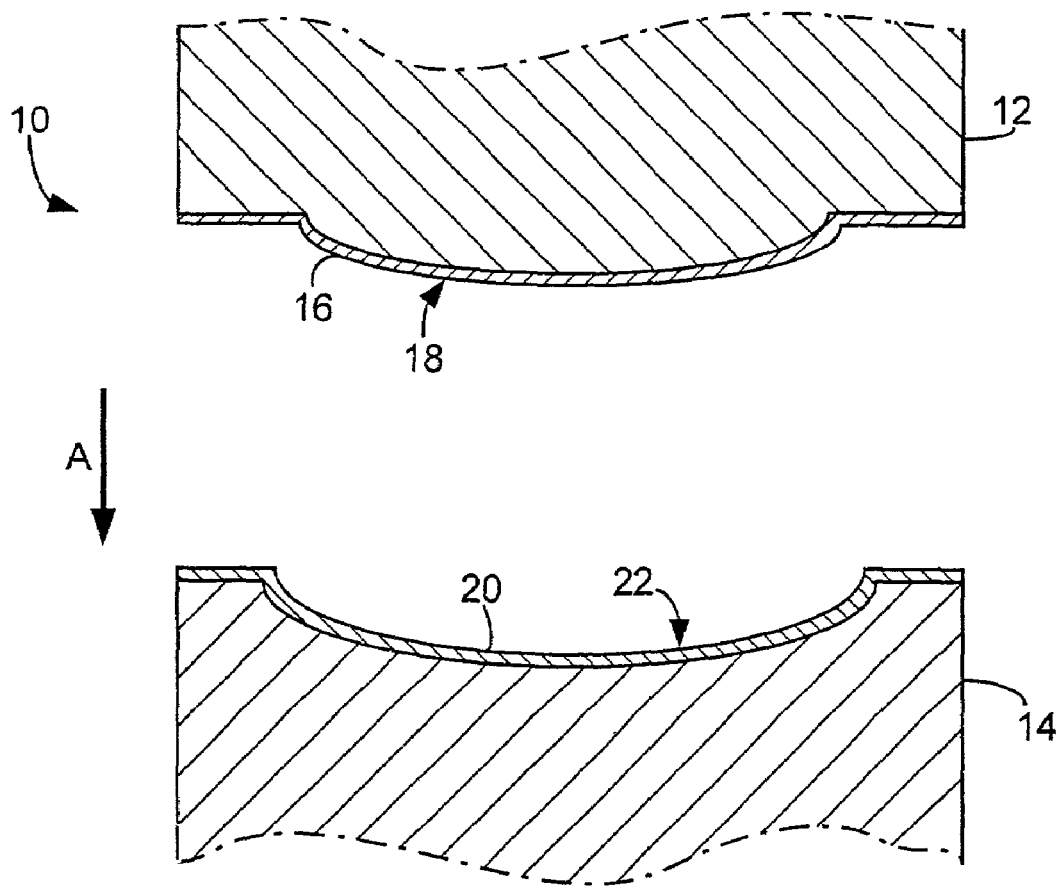
FIG. 1 is a perspective view of a male-female mold for an ophthalmic lens with an irradiation source irradiating the surface of the female part of the mold.

The lens is a plastic mould for producing an ophthalmic lens having a male part and a female part, the male part having a male surface and the female part having a female surface, wherein either the male surface, the female surface or both surfaces are treated to have a contact angle of less than 60 degrees but greater than 0 degrees. The mould surface may be treated with a mould coating such as plasma. Preferably, the plastic mould is reusable and the lenses resulting there from do not exhibit bubbling or sticking. Ideally, the polymeric formulation used to make the lens is free of monomer which reacts with the surface of an untreated plastic mould.

The plastic mould also has a lens-forming cavity of the mold which selectively receives a lens-forming polymerizable material to be cured therein to create the lens.

The mold itself can be comprised of plastic, preferably from the group of polymethylacrylate, polycarbonate, polystyrene, nylons, polyesters, polyolefins, polysulfone, polyacrylate, polyethylene, polypropylene, or polyvinylchloride and Zeonex®. Alternately, the mold can be comprised of other hard, clear materials which allow UV curing of the lens forming material held within the lens-forming cavity.

The plasma coating to perform such tasks can be formed from the monomer groups consisting of diaminocyclohexane, vinylpyrrolidone, silane monomer, such as trimethylsilane (TMS), or a mixture of trimethylsilane and oxygen, a mixture of trimethylsilane and nitrogen, a mixture of trimethylsilane, oxygen, and nitrogen. As non-plasma coating to perform a similar effect can be a LBL (layer-by-layer) from the group of polymers, polyethylene imine, a mixture of polyethylene imine /PAAm, $NH_2$-polyvinylalcohol. Or diamond like carbon (DLC) coating can also be used for this application. Most preferably, the plasma is from a mixture of trimethylsilane and oxygen and nitrogen, or a DLC or exBemex. The treatment can be any material that exhibits a water contact angle of less than 60 degrees but greater than 0 degrees.

The surfaces of the mold cavity are treated such that at least the female mold surface preferably has a water contact angle less than 60 degrees but greater than 0 degrees. Preferably, the mold surface has a contact angle less than 40 degrees but greater than 0 degrees. Contact angle is preferably measured using the Sessile drop method, typically using a Kruss G 40 system and water of surface tension 71,35 mN/m. The contact angle measurements are typically performed 30, 60, 90, 120 and 150 seconds after the drop is placed on the sample sheet. With those values an extrapolation for the contact angle at t=0 seconds is performed. The mean value of the sample sheet was calculated by five of these extrapolated values.

In addition, the treatment should be uniform over the surface of the mould, completely covering the mould surface. The uniformity of the surface can be measured using the Wihelmy method, typically using a Kruss K121 measurment system at 20° C.

With reference to the figures in which like numerals represent like elements throughout, FIG. 1 is a perspective view of a male-female mold 10 for the molding of an ophthalmic lens, such as a contact lens. The mold 10 is comprised of an upper male part 12 and a lower female part 14. The male part 12 has convex projection with the male surface 16, and the female part 14 has a concave recess with the female surface 20 of the mold 10. The male surface 16 can have a coating 18 and the female surface 20 can likewise have a coating 22 where the coating 18 and 20 facilitate in the release of the ophthalmic lens produced in the mold 10. While a single lens-forming mold 10 is shown here, the present invention can be used with many molds together, such as is common in a mold tray as is known in the art of manufacturing ophthalmic lenses.

Figure 2:
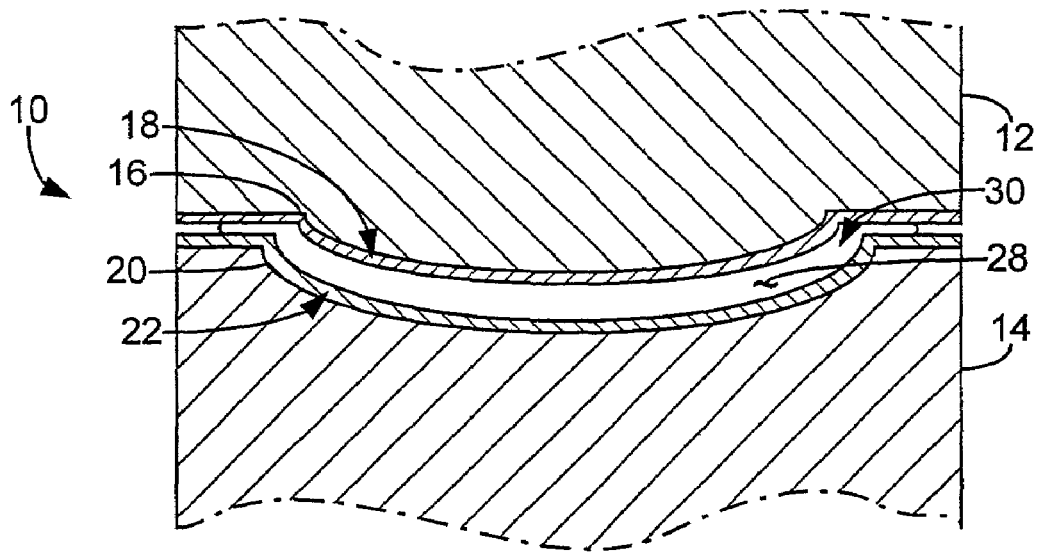
FIG. 2 is a perspective view of the male-female mold of FIG. 1 closed with a polymer material held within a lens-forming cavity.

As shown in FIG. 2, the male part 12 and female part 14 are placed in proximate relation to each other to create a lens-forming cavity 28 that selectively receives a lens-forming material 30 to be cured therein to create the lens. The male part 12 is moved downward, in the direction of arrow A, after the lens-forming material 30 is placed within the female surface 20 of the mold 10 whereby the male surface 16, or male surface coating 18 if present, touch the lens-forming material to create the concave portion of the formed lens. Such method of curing a monomeric or polymeric material is well known in the art of the manufacture of contact lenses. Importantly, the polymeric material should be of a type Free of monomers that would attack or degrade the plastic mould in any way. The male part 12 and female part 14 of the mold 10 can be made of a clear plastic resin that allows the transmission of UV or other irradiation to cure the lens-forming material 30, thus liking the monomer or polymer to a solid or semi-solid state.

The mold 10 can be comprised of a clear resin or plastic, and the plastic is preferably from the group of polymethylacrylate, polycarbonate, polystyrene, nylons, polyesters, polyolefins, polysulfone, polyacrylate, or polyvinylchloride. The plasma comprising the coating is preferably selected from the group comprised of diaminocyclohexane, polyvinylpyrrolidone, a mixture of trimethylsilane and oxygen, a mixture of trimethylsilane and nitrogen, a mixture of trimethylsilane, oxygen, and nitrogen, polyethylene amine, a mixture of polyethylene amine /PAAm, $NH_2$-polyvinylalcohol, and DLC exBemex. Most preferably, the plasma coating is either is a mixture of trimethylsilane, oxygen, and nitrogen, polyethylene amine, or DLC exBemex, as those coating tend to have the best release and curing characteristics.

The invention also relates to a method of making a mould comprising the steps of treating a male surface or female surface of a reusable plastic mould with a plasma, wherein said plasma renders the surface of the reusable plastic mould more hydrophilic than the pre-treated male or female surface.

While there has been shown a preferred embodiment of the present inventive apparatus and method, it should be understood that certain changes may be made in the arrangement of the elements of the apparatus, materials used, and steps of the method without departing from the spirit and scope of the invention as is particularly set forth in the claims.

We claim:

1. An article, comprising:
   a reusable plastic mould for producing an ophthalmic lens having a male part and a female part, the male part having a male surface and the female part having a female surface, wherein either the male surface, the female surface or both surfaces are treated to have a water contact angle of less than 60 degrees but greater than 0 degrees, and wherein the female surface, the male surface or both are coated with polyethylene amine, and polyethylene amine /PAAm, $NH_2$ -polyvinylalcohol.

2. The article of claim 1, wherein either the male part or the female part are plastic.

3. The article of claim 2, wherein the plastic is selected from the group consisting of polymethylmethacrylate, polycarbonate, polypropylene, polyethylene, cyclic olefin copolymer and cyclic olefin polymer.

4. The article of claim 1, wherein the male surface, the female surface or both surfaces are treated with plasma.

5. The article of claim 1, wherein the female surface, the male surface or both are coated with polyethylene amine, a combination of polyethylene amine /PAAm, $NH_2$-polyvinylalcohol, and a diamond like carbon coating.

6. The article of claim 1, wherein the water contact angle is less than 40 degrees but greater than 0 degrees.

7. The article of claim 1, wherein the treatment covers the mold surface uniformly.

* * * * *